United States Patent [19]
Kujak

[11] Patent Number: 5,946,937
[45] Date of Patent: Sep. 7, 1999

[54] DUAL LOOP TRIPLE EFFECT ABSORPTION CHILLER UTILIZING A COMMON EVAPORATOR CIRCUIT

[75] Inventor: Stephen Kujak, Onalaska, Wis.

[73] Assignee: Gas Research Institute, Chicago, Ill.

[21] Appl. No.: 09/006,858

[22] Filed: Jan. 14, 1998

[51] Int. Cl.$^6$ ........................................... F25B 15/00
[52] U.S. Cl. ............................................. 62/476; 62/101
[58] Field of Search .......................... 62/101, 476, 484, 62/485

[56] References Cited

U.S. PATENT DOCUMENTS

| | | | |
|---|---|---|---|
| 3,266,266 | 8/1966 | Reid, Jr. ................................. | 62/476 |
| 3,717,007 | 2/1973 | Kuhlenschmidt ....................... | 62/101 |
| 3,742,728 | 7/1973 | Mamiya ................................. | 62/476 |
| 3,831,397 | 8/1974 | Mamiya ................................. | 62/476 |
| 4,520,634 | 6/1985 | Oouchi et al. ......................... | 62/476 |
| 4,542,628 | 9/1985 | Sarkisian et al. ...................... | 62/335 |
| 4,551,991 | 11/1985 | Miyoshi et al. ....................... | 62/476 |
| 4,586,344 | 5/1986 | Lutz et al. ............................. | 62/101 |
| 4,732,008 | 3/1988 | DeVault ................................. | 62/79 |
| 5,044,174 | 9/1991 | Nagao ................................... | 62/476 |
| 5,048,308 | 9/1991 | Hisajima et al. ...................... | 62/476 |
| 5,111,670 | 5/1992 | Furukawa et al. ..................... | 62/475 |
| 5,205,136 | 4/1993 | DeVault et al. ....................... | 62/476 |
| 5,335,515 | 8/1994 | Rockenfeller et al. ................ | 62/476 |
| 5,390,509 | 2/1995 | Rockenfeller et al. ................ | 62/476 |
| 5,467,614 | 11/1995 | DeVault ................................. | 62/476 |

*Primary Examiner*—William Doerrler
*Attorney, Agent, or Firm*—Pauley Peterson Kinne & Fejer

[57] ABSTRACT

A heat absorption system having a first absorption circuit for operation at a first temperature range and a second absorption circuit for operation at a second temperature range, the temperature range of the second absorption circuit having a lower maximum temperature relative to the first temperature range of the first absorption circuit. The first absorption circuit includes a first circuit generator, a first circuit condenser, and a first circuit absorber operatively connected together. The second absorption circuit includes a second circuit generator, a second circuit condenser, and a second circuit absorber operatively connected together. A common evaporator is operatively connected to each of the first circuit condenser and the second circuit condenser and is in heat exchange communication with an external heat load. The first circuit condenser and the first circuit absorber are in heat exchange communication with the second circuit generator.

16 Claims, 2 Drawing Sheets tion refrigeration cycle and machine having thermal performance comparable to the superior thermal performance of known triple effect absorption chillers compared to existing single effect, double effect, or dual loop absorption chillers/heat pumps/refrigeration cycle machines and having substantially less complexity than known triple effect absorption chillers.

DUAL LOOP TRIPLE EFFECT ABSORPTION CHILLER UTILIZING A COMMON EVAPORATOR CIRCUIT

BACKGROUND OF THE INVENTION

1. Field of the Invention

This invention relates to a method and apparatus for an absorption refrigeration cycle and machine having thermal performance comparable to the superior thermal performance of known triple effect absorption chillers compared to existing single effect, double effect, or dual loop absorption chillers/heat pumps/refrigeration cycle machines and having substantially less complexity than known triple effect absorption chillers.

2. Description of Prior Art

Absorption chillers are heat driven refrigeration machines in which a secondary fluid, the absorbent, absorbs the primary fluid, gaseous refrigerant, that has been vaporized in an evaporator. In a typical single effect absorption refrigeration system, water is used as the refrigerant and lithium bromide as the absorbent. Other refrigerant/absorbent pairs (solutions) have been used, or have the potential for use, in absorption cycles.

In a single effect absorption chiller, refrigerant vapor is produced in an evaporator at a temperature somewhat below that of the heat load. The refrigerant vapor is exothermically absorbed by a concentrated absorbent solution entering the absorber. The heat of absorption is then transferred to a heat sink, such as cooling water, at the absorber. The now dilute absorbent solution is pumped to the generator, where it is concentrated again and returned to the absorber. External heat is supplied to the generator to supply the energy required to separate the refrigerant from the absorbent. The refrigerant is condensed at the condenser and is returned to the evaporator, while the concentrated absorbent is returned to the absorber. A heat exchanger between the absorber and generator is also part of the system, exchanging heat to the dilute absorbent from the concentrated absorbent solution. This process is carried out between two pressures, a lower pressure in the evaporator-absorber section and a higher pressure in the generator-condenser section. The operating temperature limits of the refrigerant/absorbent combinations are determined by the chemical and physical properties of the solution pair.

The coefficient of performance (COP) of a single effect absorption chiller is typically about 0.5 to 0.7. COPs above 1.0 in a single effect cycle are not possible because, for example, the heat required to generate one pound of refrigerant is not less than the heat taken up when this pound evaporates in the evaporator.

The COP of absorption refrigeration machines can be increased by using a double-effect evaporation principle and a double-effect generator. In such machines, two generators are used, one at high temperature and pressure heated by an external source of thermal energy and a second at lower pressure and temperature heated by condensation of the vapor from the first generator. Condensate from both generators is conveyed to the evaporator. In this manner, the external thermal energy is effectively utilized twice in the high and low temperature generators, thereby increasing the overall thermal efficiency compared to single effect absorption systems. The thermal efficiency of such double-effect cycles is typically in the range of about 1.0 to 1.2. Such multiple stage absorption/refrigeration systems are taught, for example, by U.S. Pat. No. 5,044,174 which teaches a refrigeration machine having an evaporator section, an absorber section, condenser section and a regenerator section respectively divided into two stages. U.S. Pat. No. 4,520,634 teaches a triple-stage absorption refrigeration system having three generators wherein gas refrigerant produced in a first generator is used as a heating source of a second generator, gas refrigerant produced in the second generator is used as a heating source of a third generator, a cooling medium flow system through which a cooling medium flows through an absorber after flowing through a condenser, and a dilute solution supply system wherein a dilute solution containing a relatively high amount of cooling medium is supplied directly to each generator without passing through other generators. U.S. Pat. No. 5,205,136 teaches a triple effect absorption refrigeration system having a double-condenser coupling at a parallel or series circuit for feeding the refrigerant-containing absorbent solution through the high, medium and low temperature generators utilized in the triple-effect system. The high temperature condenser receiving vaporous refrigerant from the high temperature generator is double coupled to both the medium temperature generator and the low temperature generator to enhance the internal recovery of heat within the system and thereby increase the thermal efficiency thereof See also U.S. Pat. No. 5,390,509 which teaches a triple effect absorption cycle apparatus comprising first, second and third generators each containing an aqueous absorption fluid and operating at successively higher temperatures, first, second and third condensers operating at successively higher temperatures, and operatively communicating with the generators, first heat exchange means cooperating between the third and second generators, and between the second condenser and the first generator, for directing energy therebetween, one, two or three absorbers and one, two or three fluid loops for directing aqueous absorption fluid between absorbers and second heat exchange means for exchanging energy between aqueous absorption fluid flows in said loops, and one, two or three evaporators operatively communicating with the absorbers; U.S. Pat. No. 5,335,515 which teaches a similar triple effect absorption cycle apparatus as the '509 patent; U.S. Pat. No. 4,551,991 which teaches a multi-effect absorption refrigerating system having an evaporator, a primary absorber, a plurality of generators, a condenser and a direct contact type heat exchanger which is provided with auxiliary evaporator-absorber stages in a plural set whereby the evaporator-absorber stages are divided into a plurality of groups and connected so that a solution is sent from the final absorber stage of each group into each generator, thereby permitting the solution in the first generator of a plurality of generators to work at a lower temperature level than normal; U.S. Pat. No. 3,831,397 and related U.S. Pat. No. 3,742,728 which teach a multi-stage absorption refrigeration system employing a highly concentrated solution of refrigerant to obtain an increased refrigeration effect relative to the quantity of input heat to the system as compared with a conventional system comprising a multi-stage regenerator-condenser system and at least a one-stage evaporator-absorber system having a pressure elevating device therebetween; U.S. Pat. No. 3,717,007 which teaches an air-cooled double-effect salt solution absorption refrigeration machine having high and low pressure generator stages which is operated with a lower pressure in the evaporator than in the absorber; U.S. Pat. No. 3,266,266 which teaches a double-effect absorption refrigeration machine in which refrigerant is released from the absorbent solution into generating stages; U.S. Pat. No. 4,542,628 which teaches a coupled dual loop absorption system having two separate complete loops, each of which operates at three temperatures and two pressures, whereby the low temperature loop absorber and condenser are thermally coupled to the high temperature loop evaporator and the high temperature loop condenser and absorber are thermally coupled to the low temperature generator; U.S. Pat. No. 5,467,614 which teaches a dual circuit absorption refrigeration system comprising a high-temperature single-effect refrigeration loop and a lower temperature double-effect refrigeration loop separate from one another and provided with a double-condenser coupling therebetween, the high temperature condenser of the single-effect refrigeration loop being double coupled to both of the generators and the double-effect refrigeration loop to improve internal heat recovery and employing a heat and mass transfer additive in the lower temperature double-effect refrigeration loop to improve the performance of the absorber and the double-effect refrigeration loop; and U.S. Pat. No. 4,732,008 which teaches a triple effect absorption method and apparatus in which two single effect absorption circuits are combined with heat exchange occurring between a condenser and absorber of a high temperature circuit and a generator of a low temperature circuit, the evaporators of both the high and low temperature circuits providing cooling to an external heat load.

The dual loop triple effect configuration of the apparatus of the '008 patent employs two separate generator/condenser/evaporator/absorber circuits utilizing two different absorbent-refrigeration fluids. The two different circuits are separate and the fluids are not allowed to mix. This separation of the two absorbent salt-refrigerant fluids adds costs and increases the complexity and size of a dual loop triple effect chiller.

SUMMARY OF THE INVENTION

Accordingly, it is an object of this invention to provide a dual loop triple effect absorption chiller which overcomes the technical difficulties associated with known dual loop triple effect chillers which employ two separate circuits.

One reason for the use of separate circuits as taught by the '008 patent is due to the significant problems associated with mixing refrigerants generated from different absorbent-refrigerant salt combinations. When refrigerant is generated from the specific absorbent salt-refrigerant pair, a small amount of the absorbent salt migrates with the refrigerant to the evaporator section. If the refrigerants generated from the different absorbent-refrigerant salts are combined, the different absorbent salts become mixed. Over time, with many chiller shut down dilutions, the different absorbent salts will become contaminated, causing major chiller operational problems.

Accordingly, it is one object of this invention to provide a dual loop triple effect absorption chiller which permits refrigerants generated by separate generator circuits to mix without the possibility of contamination.

These and other objects of this invention are achieved by a heat absorption system comprising a first absorption circuit for operation at a first temperature range comprising a first circuit generator means, a first circuit condenser means, and a first circuit absorber means operatively connected together; a second absorption circuit for operation at a second temperature range having a lower maximum temperature relative to the first temperature range comprising a second circuit generator means, a second circuit condenser means, and a second circuit absorber means operatively connected together; a common evaporator means operatively connected to each of the first circuit condenser and the second circuit condenser and in heat exchange communication with an external heat load; and the first circuit condenser means and the first circuit absorber means in heat exchange communication with the second circuit generator means. In accordance with a particularly preferred embodiment, the heat absorption system of this invention further comprises means for mixing refrigerant from the first circuit condenser means with refrigerant from the second circuit condenser means.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
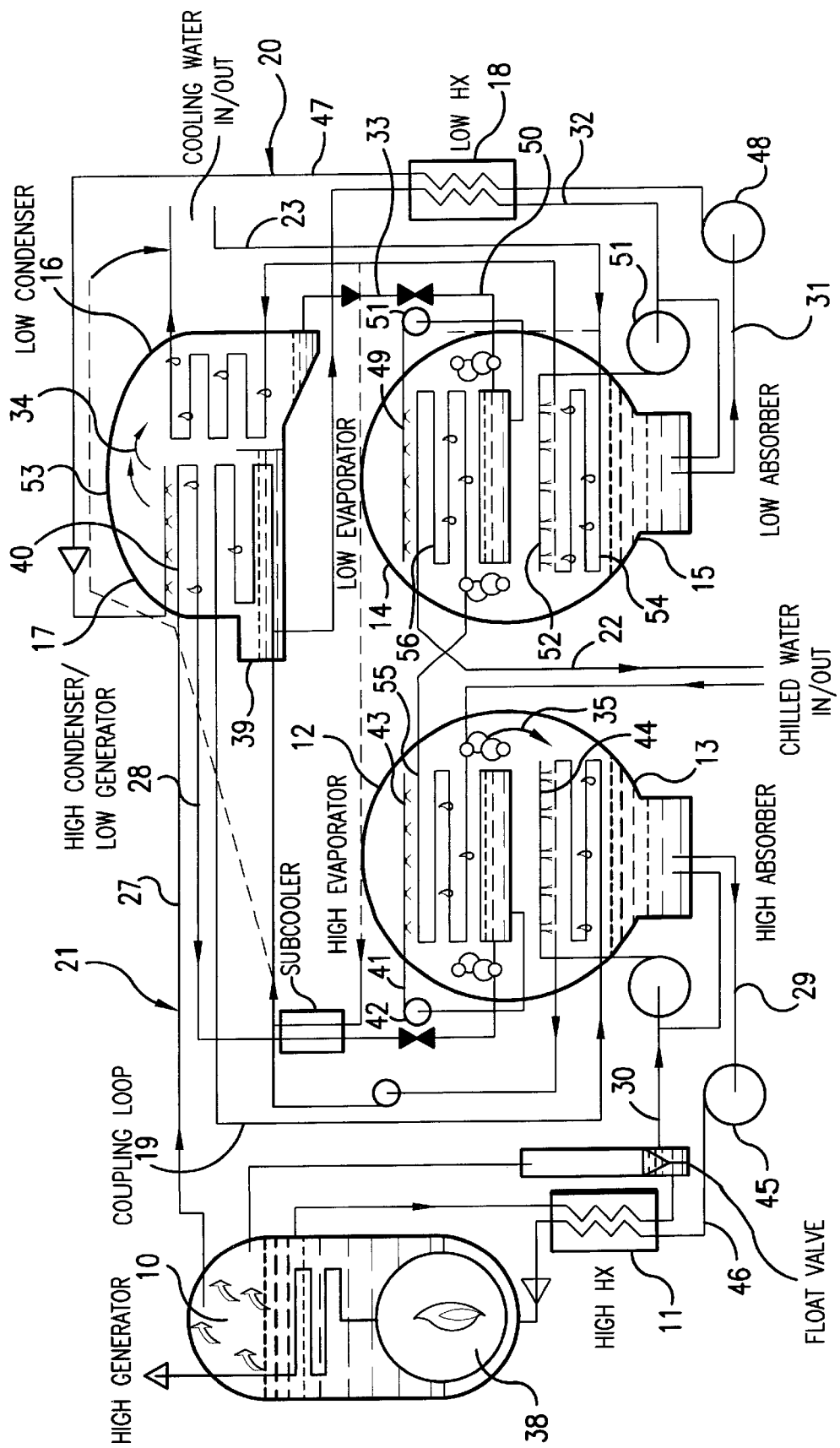
FIG. 1 is a schematic diagram of a dual loop triple effect absorption chiller having two refrigeration circuits known to those skilled in the art.

A thermodynamic representation of known dual loop triple effect absorption chillers is shown in FIG. 1. Such chillers employ two refrigeration circuits, high temperature circuit 21 and low temperature circuit 20 with separate solution fluids in each circuit. The high temperature refrigeration circuit 21 is in heat exchange with the low temperature refrigeration circuit 20 by means of coupling loop 19, providing heat exchange between high temperature condenser/low temperature generator 17 and high temperature absorber 13.

The high temperature circuit operates in the same fashion as a conventional single-effect absorption chiller, except that the condenser and the absorber of this high temperature circuit are operated at a much higher temperature than in a conventional single effect chiller. The high temperature refrigeration circuit 21 is preferably operated within a temperature range of from about 0° C. to about 280° C. while the lower temperature refrigeration circuit 20 is operated within a temperature range of from about 0° C. to about 130° C.

The high temperature refrigeration circuit 21 is operated in a manner such that both the high temperature circuit condenser 17 and the high temperature circuit absorber 13 are at a higher temperature than the generator of the low temperature circuit 20. As a result, all of the heat rejected by both the high temperature circuit condenser 17 and the high temperature circuit absorber 13 is effectively utilized to heat the low temperature circuit generator, thereby producing substantially more refrigerant vapor in the lower temperature circuit 20 than is generated in the high temperature circuit 21 with the input of external thermal energy. At the same time, the high temperature circuit evaporator 12 is operated at a lower enough temperature to provide useful cooling.

More particularly, the known absorption chiller shown in FIG. 1 includes high temperature circuit 21 and lower temperature circuit 20. In each circuit, an absorption pair (absorbent/refrigerant or multiple fluid component mixture) is used. The preferred solution pair for the low temperature circuit is a conventional mixture of lithium bromide, water, a heat transfer additive, and a corrosion inhibitor. Other solution pairs useful for use in low temperature circuit 20 include, for example, ammonia and water, R-22 and E-181, R-123a and ETFE, a ternary mixture of methanol with lithium bromide and zinc bromide, a ternary mixture of water with zinc chloride and lithium bromide, and many other absorption fluid solution mixtures. The absorption solution pairs suitable for use in high temperature circuit 21 are more limited due to the required higher temperature of high temperature generator 10, preferably greater than about 200° C., and the much larger temperature difference between high temperature evaporator 12 at about 5° to 10° C. and the high temperature condenser 17 and high temperature absorber 13 at about 90° to 110° C. A conventional mixture of lithium bromide, water, heat transfer additive and corrosion inhibitor cannot normally be used in high temperature circuit 21 due to the crystallization limit of the lithium bromide/water solution pair. Absorption solution pairs suitable for use in high temperature circuit 21 include, for example, ammonia and water, ammonia with lithium bromide and water, ammonia and various thiocyanate salt mixtures, sodium hydroxide and water, trifluoroethanol and several absorbents, and other absorption fluid solution mixtures.

Referring to FIG. 1, high temperature circuit 21 includes high temperature generator 10, high temperature condenser 17, high temperature evaporator 12, and high temperature absorber 13. Low temperature circuit 20 includes low temperature generator 39, low temperature condenser 16, low temperature evaporator 14, and low temperature absorber 15. High temperature circuit 21 and low temperature circuit 20 are coupled by coupling loop 19 such that heat rejected from high temperature absorber 13 and high temperature condenser 17 is used as heat input for low temperature generator 39. High temperature generator 10 is heated by high temperature heat input 38 which may be any suitable heat source such as a burner, high temperature stream, etc. The heat from high temperature heat input 38 is transferred to a weak absorbent solution discharged from high temperature/weak absorbent line 29, resulting in concentration of the absorbent solution due to removal of the refrigerant therefrom. Refrigerant vapor thus formed flows through high temperature/refrigerant vapor line 27 into low temperature circuit generator 39 which is disposed within a single shell together with high temperature circuit condenser 17 and low temperature circuit condenser 16. The vaporized refrigerant is condensed within conduit means 40 which extends through high temperature circuit condenser 17 and the condensed refrigerant then flows through high temperature circuit refrigerant liquid line 28 into high temperature circuit evaporator 12 disposed within a shell with high temperature circuit absorber 13. The condensed refrigerant is recirculated through conduit means 41 by high temperature refrigerant pump 42 through spray header 43 back to high temperature circuit evaporator 12. Vaporized refrigerant, that is refrigerant which evaporates in high temperature circuit evaporator 12, is conveyed as indicated by arrow 35 from high temperature circuit evaporator 12 into high temperature circuit absorber 13 where it dilutes or weakens the strong absorbent provided through high temperature circuit strong absorbent line 30 from high temperature circuit generator 10 by way of high temperature circuit heat exchanger 11 through spray header 44. In the high temperature circuit 21, the weak absorbent solution from high temperature circuit absorber 13 is conveyed by high temperature circuit pump 45 by way of high temperature circuit weak absorbent line 29 and conduit means 46 through high temperature circuit heat exchanger 11 to high temperature circuit generator 10, thereby completing the fluid flow through high temperature circuit 21.

In low temperature circuit 20, low temperature circuit absorber 15 disposed in a common shell with low temperature circuit evaporator 14, is connected to low temperature circuit generator 39 through low temperature circuit heat exchanger 18 by low temperature circuit weak absorbent line 31, low temperature circuit pump 48, and conduit means 47, and by low temperature circuit strong absorbent line 32. Low temperature circuit generator 39 is connected to low temperature circuit condenser 16 through demister 34. The outlet of low temperature circuit condenser 16 is connected through low temperature circuit refrigerant liquid line 33 to low temperature circuit evaporator 14. Refrigerant liquid is circulated through low temperature circuit evaporator 14 by means of conduit 50, pump 51, and spray header 49.

In low temperature circuit 20, strong absorbent solution flows from low temperature circuit generator 39 through low temperature circuit heat exchanger 18, low temperature circuit strong absorbent line 32, and pump 51 to spray header 52 into low temperature circuit absorber 15 where it absorbs refrigerant vapor coming from low temperature circuit evaporator 14 which is disposed within the same shell as low temperature circuit absorber 15 and is in direct communication therewith. The resulting weak absorbent solution is pumped through low temperature circuit heat exchanger 18 by means of low temperature circuit weak absorbent line 31 and low temperature circuit pump 48, through conduit means 47 and subsequently through spray header 53 disposed in the shell comprising high temperature circuit condenser 17, low temperature circuit generator 39, and low temperature circuit condenser 16.

A secondary fluid, such as cooling water, may be circulated through low temperature circuit condenser 16 and absorber coil 54 in low temperature circuit absorber 15 by means of cooling water circuit 23. Another secondary fluid, such as chill water, is circulated through high temperature circuit evaporator coil 55 and low temperature circuit evaporation coil 56 by means of chill water circuit 22.

As can clearly be seen, the system shown in FIG. 1 requires two complete temperature circuits, a high temperature circuit 21 and a low temperature circuit 20, the solution pairs of which never mix. By comparison, the dual loop triple effect absorption chiller of this invention is substantially less complex, requires fewer components which, in turn, permits a reduction in size compared to known dual loop triple effect chillers as well as a reduction in cost, and permits the mixing of refrigerants from the high temperature and low temperature circuits. A schematic diagram of the dual loop triple effect absorption chiller in accordance with this invention is shown in FIG. 2.

Figure 2:
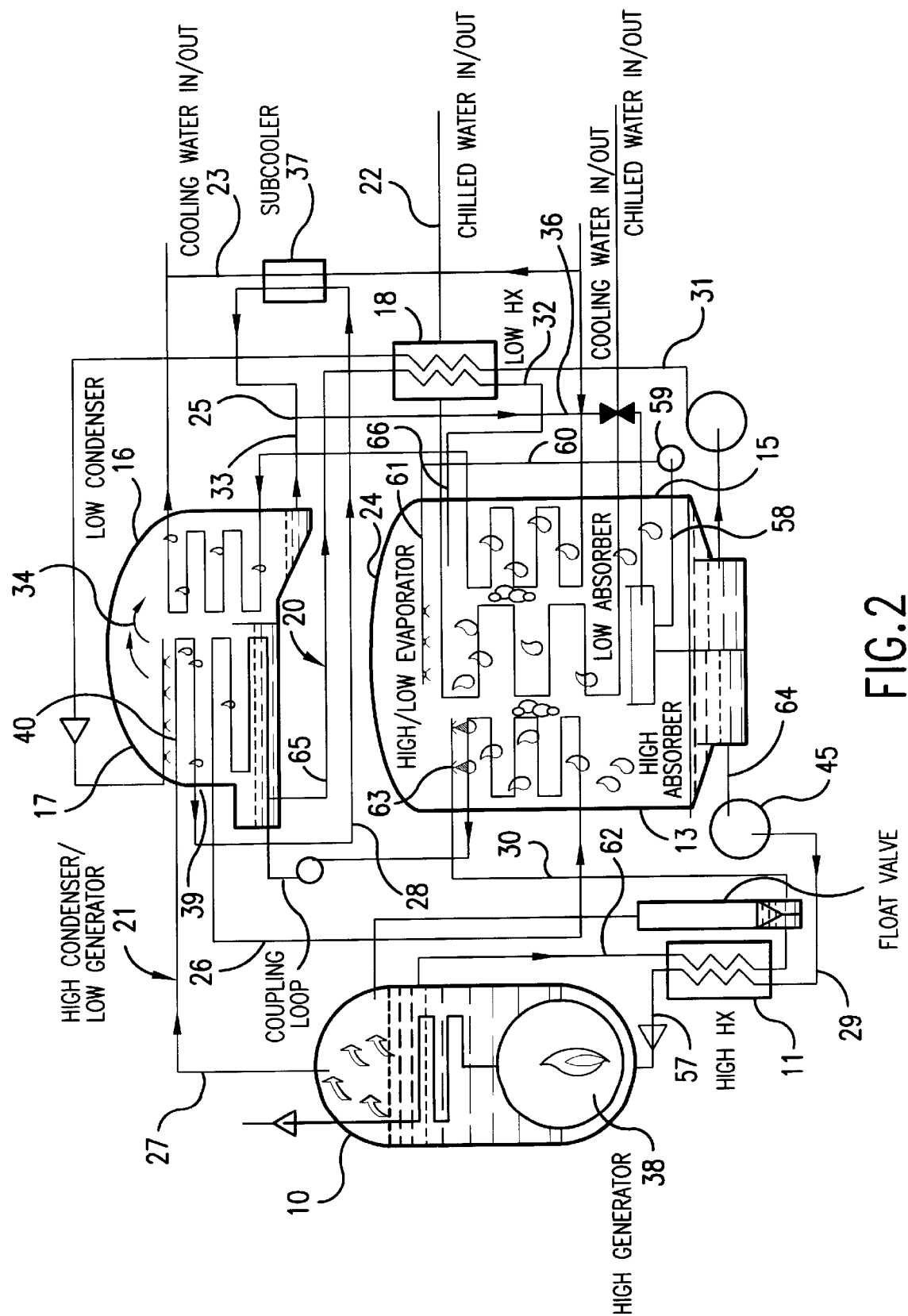
FIG. 2 is a schematic flow diagram of a dual loop triple effect absorption chiller utilizing a common evaporator circuit in accordance with the method and apparatus of this invention.

Referring to the invention shown in FIG. 2, high temperature circuit 21 comprises high temperature circuit generator 10, high temperature circuit condenser 17 and high temperature circuit absorber 13. Low temperature circuit 20 comprises low temperature circuit generator 39, low temperature circuit condenser 16, and low temperature circuit absorber 15. As shown in FIG. 2, high temperature circuit condenser 17, low temperature circuit generator 39, and low temperture circuit condenser 16 are disposed in a common shell and high temperature circuit absorber 13 and low temperature circuit absorber 15 are disposed in another common shell. As also can be seen in FIG. 2, the high temperature circuit 21 and low temperature circuit 20 of the dual loop triple effect absorption chiller of this invention share a common evaporator 24 which is disposed within the shell containing high temperature circuit absorber 13 and low temperature circuit absorber 15.

As in the case of the known dual loop triple effect absorption chiller shown in FIG. 1, the chiller of this invention comprises high temperature circuit 21 and low temperature circuit 20 being coupled so that heat rejected from high temperature circuit absorber 13 and high temperature circuit condenser 17 is used as heat input for low temperature circuit generator 39.

As before, high temperature circuit generator 10 is contained within a shell and is heated by heat from high temperature heat input 38 which may be any suitable heat source such as a burner, high temperature stream, etc. Heat is transferred from high temperature heat input 38 to a weak absorbent solution being discharged from conduit 57 into high temperature circuit generator 10. The absorbent solution is concentrated as a result of vaporization of the refrigerant therein, which refrigerant vapor flows from high temperature circuit generator 10 through high temperature circuit refrigerant vapor line 27 into low temperature circuit generator 39 within the shell housing high temperture circuit condenser 17 and low temperature circuit condenser 16. The refrigerant vapor is condensed within conduit means 40 which extends through high temperature circuit condenser 17 disposed within a portion of low temperature circuit generator 39 after which it flows through high temperature circuit refrigerant liquid line 28 and into mixer 25 where it mixes with refrigerant liquid from low temperature circuit condenser 16 flowing through low temperature circuit refrigerant liquid line 33. The combined refrigerant liquid from high temperature circuit 21 and low temperature circuit 20 flows through high temperature circuit/low temperature circuit mixed refrigerant liquid conduit 36 into low temperature circuit absorber 15 from which it is circulated through conduit means 58, pump 59, conduit means 60 and spray header 61 into common evaporator 24. Strong absorbent produced by high temperature generator 10 flows through conduit means 62, high temperature circuit heat exchanger 11, high temperature circuit strong absorbent line 30, through spray header 63 into high temperature circuit absorber 13 in which it combines with refrigerant vapor from common evaporator 24 to produce a high temperature circuit weak absorbent which is withdrawn from high temperature circuit absorber 13 through conduit means 64 and returned by way of high temperature circuit pump 45 through high temperature circuit weak absorbent line 29, high temperature heat exchanger 11, conduit means 57, and into high temperature circuit generator 10.

In the low temperature circuit, utilizing the heat in the refrigerant vapor generated by high temperture circuit generator 10 and the heat from high temperature circuit absorber 13, low temperature circuit refrigerant vapor is produced in low temperature circuit generator from which it is communicated through demisters 34 into low temperature circuit condenser 16 in which it is condensed. Refrigerant liquid produced in low temperature circuit condenser 16 is withdrawn through low temperature circuit refrigerant liquid line 33 as previously indicated from which it flows into mixer 25 where it mixes with refrigerant liquid from high temperture circuit 21. The strong absorbent solution produced in low temperature circuit generator 39 is withdrawn therefrom through conduit means 65 from which it flows through low temperature circuit heat exchanger 18, low temperature circuit strong absorbent line 32 and into spray headers 66 into low temperature circuit absorber 15.

The absorbent/refrigerant solutions utilized in the high temperature circuit 21 and low temperature circuit 20 of the absorption chiller of this invention are the same, thereby allowing for the refrigerants from both circuits to mix without concern for absorbent salt contamination. This is in contrast to known dual loop triple effect absorption chillers which typically utilize different absorbent/refrigerant solutions in the high temperature and low temperature circuits.

In general terms, suitable absorbent salts for use in this invention include, but are not limited to, salts having at least one cation selected from the group consisting of one or more alkaline metals, alkaline earth metals, transition metals, zinc, and mixtures thereof. Alternatively, suitable salts include, without limitation, salts having at least one cation selected from the group consisting of sodium, lithium, potassium, calcium, magnesium, zinc, iron, cobalt, copper, aluminum, and mixtures thereof. Suitable salts also include, but are not limited to, salts having at least one anion selected from the group consisting of halide, hydroxyl, nitrite, thiocyanate, and mixtures thereof. Alternatively, suitable salts include at least one ion selected from the group consisting of halides, chlorides, bromide, iodide, and mixtures thereof. The proportion of salt to water suitable for use in this invention is any proportion sufficient to provide utility as an absorbent. Preferred absorbent/refrigerant solutions suitable for use in the absorption chiller of this invention are selected from the group consisting of lithium bromide/water, zinc bromide/water, calcium bromide/water, and mixtures thereof.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A heat absorption system comprising:
    a first absorption circuit for operation at a first temperature range comprising a first circuit generator means, a first circuit condenser means, and a first circuit absorber means operatively connected together;
    a second absorption circuit for operation at a second temperature range having a lower maximum temperature relative to said first temperature range comprising a second circuit generator means, a second circuit condenser means, and a second circuit absorber means operatively connected together;
    a common evaporator means operatively connected to each of said first circuit condenser and said second circuit condenser and in heat exchange communication with an external heat load; and
    said first circuit condenser means and said first circuit absorber means in heat exchange communication with said second circuit generator means whereby a first absorbent salt circulating in said first absorption circuit and a second absorption salt circulating in said second absorption circuit do not mix with each other and refrigerants circulating in each of said first absorption circuit and said second absorption circuit do mix.

2. A heat absorption system in accordance with claim 1 further comprising means for mixing refrigerant from said first circuit condenser means with refrigerant from said second circuit condenser means.

3. A heat absorption system in accordance with claim 1, wherein said first absorbent salt and said second absorbent salt are the same.

4. A heat absorption system in accordance with claim 3, wherein said absorbent salt comprises at least one cation selected from the group consisting of alkali metals, alkaline earth metals, transition metals, zinc, and mixtures thereof.

5. A heat absorption system in accordance with claim 4, wherein said absorbent salt comprises at least one cation selected from the group consisting of sodium, lithium, potassium, calcium, magnesium, zinc, iron, cobalt, copper, aluminum, and mixtures thereof.

6. A heat absorption system in accordance with claim 3, wherein said absorbent salt comprises at least one anion selected from the group consisting of halide, hydroxyl, nitrates, thiocyanate, and mixtures thereof.

7. A heat absorption system in accordance with claim 6, wherein said absorbent salt comprises at least one anion selected from the group consisting of chloride, bromide, iodide, and mixtures thereof.

8. A heat absorption system in accordance with claim 3, wherein said absorbent salt is selected from the group consisting of lithium bromide, zinc bromide, calcium bromide, and mixtures thereof.

9. In a heat absorption system having a first absorption circuit for operation at a first temperature range comprising a first circuit generator means, a first circuit condenser means, and a first circuit absorber means operatively connected together, and a second absorption circuit for operation at a second temperature range having a lower maximum temperature relative to said first temperature range comprising a second circuit generator means, a second circuit condenser means, and a second circuit absorber means operatively connected together, the improvement comprising:

a common evaporator means operatively connected to each of said first circuit condenser and said second circuit condenser and in heat exchange communication with an external heat load; and said first circuit condenser means and said first circuit absorber means in heat exchange communication with said second circuit generator means, whereby a first absorbent salt circulating in said first absorption system and a second absorption salt circulating in a second absorption system do not mix with each other.

10. A heat absorption system in accordance with claim 9 further comprising means for mixing refrigerant from said first circuit condenser means with refrigerant from said second circuit condenser means.

11. A heat absorption system in accordance with claim 9, wherein said first absorbent salt and said second absorbent salt are the same.

12. A heat absorption system in accordance with claim 11, wherein said absorbent salt comprises at least one cation selected from the group consisting of alkali metals, alkaline earth metals, transition metals, zinc, and mixtures thereof.

13. A heat absorption system in accordance with claim 12, wherein said absorbent salt comprises at least one cation selected from the group consisting of sodium, lithium, potassium, calcium, magnesium, zinc, iron, cobalt, copper, aluminum, and mixtures thereof.

14. A heat absorption system in accordance with claim 11, wherein said absorbent salt comprises at least one anion selected from the group consisting of halide, hydroxyl, nitrates, thiocyanate, and mixtures thereof.

15. A heat absorption system in accordance with claim 14, wherein said absorbent salt comprises at least one anion selected from the group consisting of chloride, bromide, iodide, and mixtures thereof.

16. A heat absorption system in accordance with claim 11, wherein said absorbent salt is selected from the group consisting of lithium bromide, zinc bromide, calcium bromide, and mixtures thereof.

* * * * *